(12) United States Patent
Sudo et al.

(10) Patent No.: US 6,608,957 B2
(45) Date of Patent: Aug. 19, 2003

(54) OPTICAL-FIBER HOLDER HAVING AN OPTICAL-FIBER WINDING FRAMEWORK CAPABLE OF TURNING AND INCLINING UPWARD

(75) Inventors: Satoshi Sudo, Kawasaki (JP); Katsuhiko Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/101,011

(22) Filed: Mar. 20, 2002

(65) Prior Publication Data

US 2003/0091314 A1 May 15, 2003

(30) Foreign Application Priority Data

Nov. 19, 2001 (JP) .................................. 2001-353220

(51) Int. Cl.⁷ ................................................. G02B 6/00
(52) U.S. Cl. ........................................ 385/135; 439/501
(58) Field of Search .................... 385/95, 97, 135–139; 439/501

(56) References Cited

U.S. PATENT DOCUMENTS 4,722,585 A * 2/1988 Boyer ........................ 350/96.2
4,802,724 A * 2/1989 Fraize et al. ................ 350/96.2
6,361,360 B1 * 3/2002 Hwang et al. ............... 439/501

FOREIGN PATENT DOCUMENTS

| JP | 7-218792 | 8/1995 |
| JP | 7-270626 | 10/1995 |
| JP | 10-332945 | 12/1998 |

* cited by examiner

*Primary Examiner*—Khiem Nguyen
(74) *Attorney, Agent, or Firm*—Staas & Halsey LLP

(57) ABSTRACT

This optical-fiber holder comprises an annular optical-fiber winding framework. The optical-fiber winding framework includes an optical-fiber winding frame portion and a base portion provided as a turning axle of the optical-fiber winding framework. The optical-fiber winding frame portion has an optical-fiber containing groove formed along a periphery thereof. The base portion has an opening penetrating into an interior thereof and communicating with the optical-fiber containing groove at both ends. An optical fiber is wound and held in the interior of the base portion and the optical-fiber containing groove.

8 Claims, 21 Drawing Sheets

24

OPTICAL-FIBER HOLDER HAVING AN OPTICAL-FIBER WINDING FRAMEWORK CAPABLE OF TURNING AND INCLINING UPWARD

BACKGROUND OF THE INVENTION

1. Field of the Invention

The present invention generally relates to an optical-fiber holder, and more particularly, to an optical-fiber holder rotatably supporting an optical-fiber winding framework holding an optical fiber in a winding form.

An optical fiber is used as a means for transmitting an optical signal in an optical device communicating, transmitting or processing various kinds of information in the form of optical signals. In an optical unit or an optical module provided within such an optical device for transmitting or receiving an optical signal, an optical fiber needs to have a predetermined length plus an extra length, and this extra length is to be wound orderly beyond a predetermined radius and held so that the extra length does not cause a congestion.

2. Description of the Related Art

FIG. 1A is a plan view of a printed board unit as the above-mentioned optical unit. FIG. 1B is a side view of this printed board unit. In this printed board unit, a multitude of electronic components are mounted on a printed wiring board 1. The electronic components are connected with wiring patterns formed on the printed wiring board 1 so as to form a predetermined operational circuit. It is noted that FIG. 1B shows only one of the electronic components so as not to confuse the figure.

Not only elements, such as a resistor, a capacitor, and an IC device, are soldered on the electronic component, but also an IC device 3 is mounted thereon. The IC device 3 is inserted into a square socket 2. An optical module 4 transmits and/or receives an optical signal, and comprises an optical fiber 5 led out therefrom.

An optical-connector adaptor 7 used for a publicly known SC-type optical connector is mounted on a sideboard 6 attached to a side of the printed wiring board 1. An optical connector 8 provided at an end of the optical fiber 5 connected with the optical module 4 is inserted into the optical-connector adaptor 7.

Four publicly known holders 9 made of synthetic resin are arranged upright at predetermined intervals on the printed wiring board 1. Since the above-mentioned electronic components and the optical module 4 are mounted low on the printed wiring board 1, an extra-length portion of the optical fiber 5 is inserted into the holders 9, and is wound around multiple times in circles in parallel with a surface of the printed wiring board 1 in the proximity above the electronic components.

The above-mentioned IC device 3 is inserted into the square socket 2 originally for a purpose that the IC device 3 can be easily exchanged. However, in the presence of the optical fiber 5 wound around above the IC device 3, the IC device 3 cannot be exchanged without detaching the optical fiber 5 from the holders 9. Therefore, exchanging the IC device 3 involves troublesome tasks of detaching the optical fiber 5 and the optical connector 8, and then reinserting and rewinding the optical fiber 5 and the optical connector 8, even though the IC device 3 is not very often exchanged.

Further, each of the holders 9 has an opening that is normally closed and can be opened due to an elasticity of the synthetic resin composing the holder 9. Accordingly, the optical fiber 5 can be detached or inserted only when the opening of each of the holders 9 is being opened against a closing elastic force thereof, which makes the tasks considerably troublesome.

SUMMARY OF THE INVENTION

It is a general object of the present invention to provide an improved and useful optical-fiber holder folder in which the above-mentioned problems are eliminated.

A more specific object of the present invention is to provide an optical-fiber holder which enables an optical fiber to be withdrawn to a withdrawal position while being kept wound around without necessitating troublesome tasks, and to be restored to an initial position immediately after predetermined operations are finished.

In order to achieve the above-mentioned objects, there is provided according to one aspect of the present invention an optical-fiber holder comprising:

an annular optical-fiber winding framework including an optical-fiber winding frame portion having an optical-fiber containing groove formed along a periphery thereof, and a base portion provided as a turning axle of the optical-fiber winding framework, the base portion having an opening penetrating into an interior of the base portion and communicating with the optical-fiber containing groove at both ends, wherein an optical fiber is wound and held in the interior of the base portion and the optical-fiber containing groove.

According to the present invention, the optical fiber is inserted into the optical-fiber winding framework via the openings of the base portion provided as the turning axle so as to be wound and contained in the optical-fiber containing groove formed along the periphery thereof. Thereby, the optical fiber can be wound and contained in the base portion and the optical-fiber containing groove without being exposed to the exterior of the optical-fiber holder. Accordingly, the optical fiber can be surely protected out of contact with extraneous substances. Further, the base portion can be inserted into and supported on a suitable support portion functioning as an axle bearing such that the optical-fiber holder can be turned to take any postures.

In order to achieve the above-mentioned objects, there is also provided according to another aspect of the present invention an optical-fiber holder comprising:

an annular optical-fiber winding framework including an optical-fiber winding frame portion having an optical-fiber containing groove formed along a periphery thereof, and a base portion provided as a turning axle of the optical-fiber winding framework, the base portion having an opening penetrating into an interior of the base portion and communicating with the optical-fiber containing groove at both ends; and a cover inserted in a periphery of the optical-fiber containing groove so as to cover the optical-fiber containing groove.

According to the present invention, the optical fiber can be wound and contained in the base portion and the optical-fiber containing groove without being exposed to the exterior of the optical-fiber holder. Additionally, the optical fiber is covered with the cover so as not to come off from the optical-fiber containing groove. Accordingly, the optical fiber can be protected more surely out of contact with extraneous substances.

In order to achieve the above-mentioned objects, there is also provided according to another aspect of the present invention an optical-fiber holder comprising:

an annular optical-fiber winding framework including an optical-fiber winding frame portion having an optical-fiber containing groove formed along a periphery thereof, and a base portion provided as a turning axle of the optical-fiber winding framework, the base portion having an opening penetrating into an interior of the base portion and communicating with the optical-fiber containing groove at both ends; and a support including a support portion holding the base portion, and an opening leading the base portion into the support portion.

According to the present invention, the optical fiber can be wound and contained in the base portion and the optical-fiber containing groove without being exposed to the exterior of the optical-fiber holder. Additionally, the base portion can be inserted via the opening of the support into the support portion while the opening of the support is forcibly pushed open against an elastic force of the support. Thereupon, the opening of the support undergoes an elastic restoration so that the support portion supports the base portion, while allowing the optical-fiber winding framework to turn to take any postures.

In order to achieve the above-mentioned objects, there is also provided according to another aspect of the present invention an optical-fiber holder comprising:

an annular optical-fiber winding framework including an optical-fiber winding frame portion having an optical-fiber containing groove formed along a periphery thereof, and a base portion provided as a turning axle of the optical-fiber winding framework, the base portion having an opening penetrating into an interior of the base portion and communicating with the optical-fiber containing groove at both ends, and having a positioning projection formed in a radial direction of the base portion on an outer surface thereof; and a support including a support portion holding the base portion, an opening leading the base portion into the support portion, and a groove accommodating the positioning projection.

According to the present invention, the optical fiber can be wound and contained in the base portion and the optical-fiber containing groove without being exposed to the exterior of the optical-fiber holder. Additionally, upon inserting the base portion, the opening of the support undergoes an elastic restoration so that the support portion supports the base portion. Further, the positioning projection of the base portion is fitted into the groove formed in the support so as to prohibit a movement of the base portion in an axial direction thereof and thus determine a position of the base portion with respect to the support. Accordingly, the optical-fiber winding framework can be stably turned to take any postures.

In order to achieve the above-mentioned objects, there is also provided according to another aspect of the present invention an optical-fiber holder comprising:

a plurality of annular optical-fiber winding frameworks each including an optical-fiber winding frame portion having an optical-fiber containing groove formed along a periphery thereof, and a base portion provided as a turning axle of the optical-fiber winding framework, the base portion having an opening penetrating into an interior of the base portion and communicating with the optical-fiber containing groove at both ends, and having a positioning projection formed in a radial direction of the base portion on an outer surface thereof; and a support including a plurality of support portions each holding the base portion, an opening leading the base portion into each of the support portions, and a groove accommodating the positioning projection, wherein the optical-fiber winding frameworks supported on the support are positioned in parallel close to each other by the positioning projection.

According to the present invention, the optical fiber is inserted into the optical-fiber winding frameworks so as to be wound and contained in the optical-fiber containing grooves. Thereby, the optical fiber can be wound and contained in the base portions and the optical-fiber containing grooves without being exposed to the exterior of the optical-fiber holder. Additionally, the base portions can be inserted via the opening of the support into the support portions while the opening of the support is forcibly pushed open against an elastic force of the support. Thereupon, the opening of the support undergoes an elastic restoration so that the support portions support the base portions. Further, the positioning projections of the base portions are fitted into the groove formed in the support so as to prohibit movements of the base portions in the axial direction thereof and thus determine positions of the base portions with respect to the support. When a plurality of the optical-fiber winding frameworks are thus inserted into and supported on a plurality of the support portions of the support, the positioning projections of the optical-fiber winding frameworks contact each other so as to position the optical-fiber winding frameworks in parallel close to each other, and the optical-fiber winding frameworks can be stably turned to take any postures.

Other objects, features and advantages of the present invention will become more apparent from the following detailed description when read in conjunction with the accompanying drawings.

DETAILED DESCRIPTION OF THE PREFERRED EMBODIMENTS

Figure 1A:
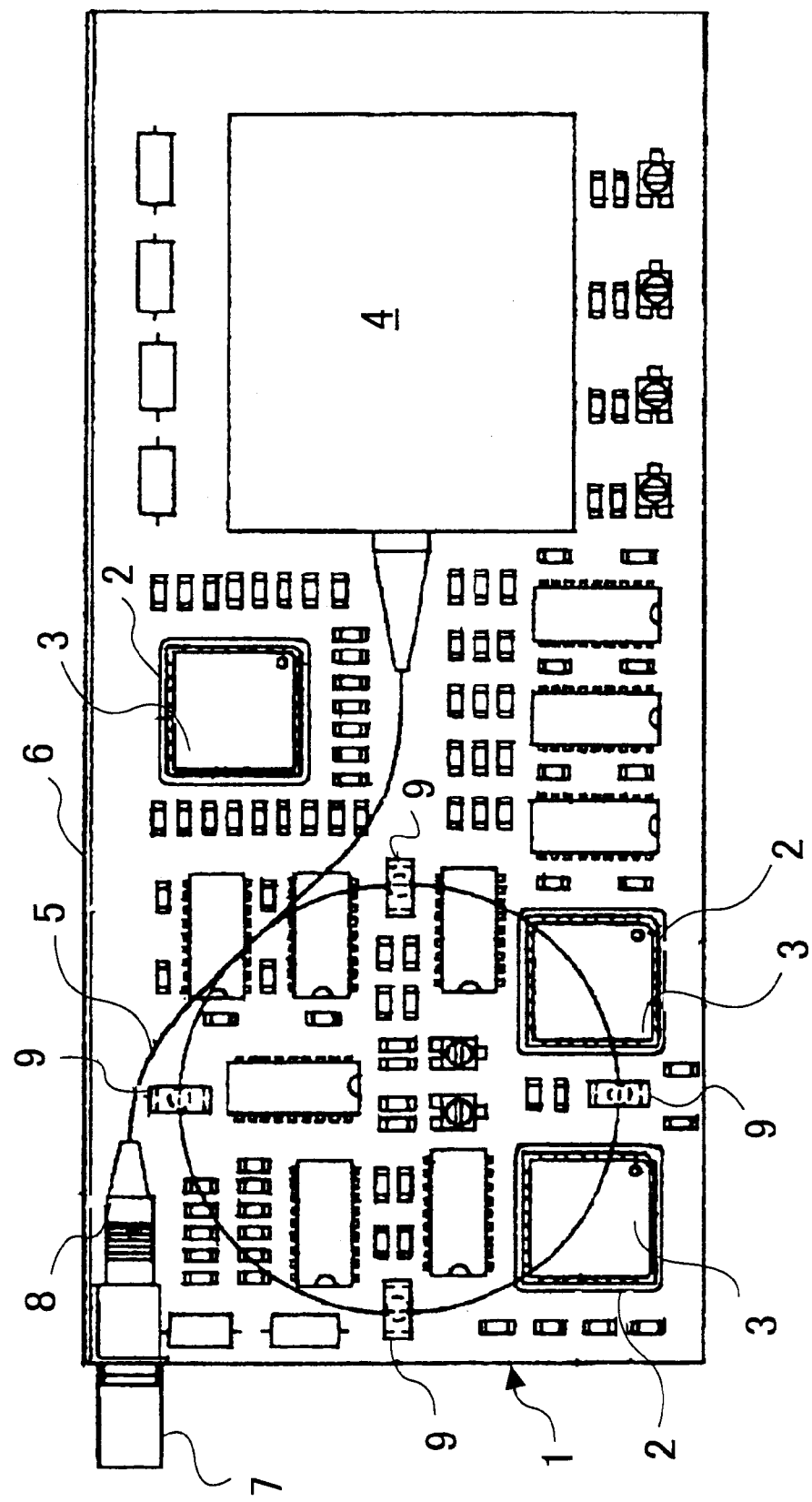
FIG. 1A is a plan view of a printed board unit containing an optical fiber in a conventional manner.

A description will now be given, with reference to the drawings, of an embodiment according to the present invention. In the drawings, identical or equivalent elements are referenced by same reference marks.

Figure 2A:
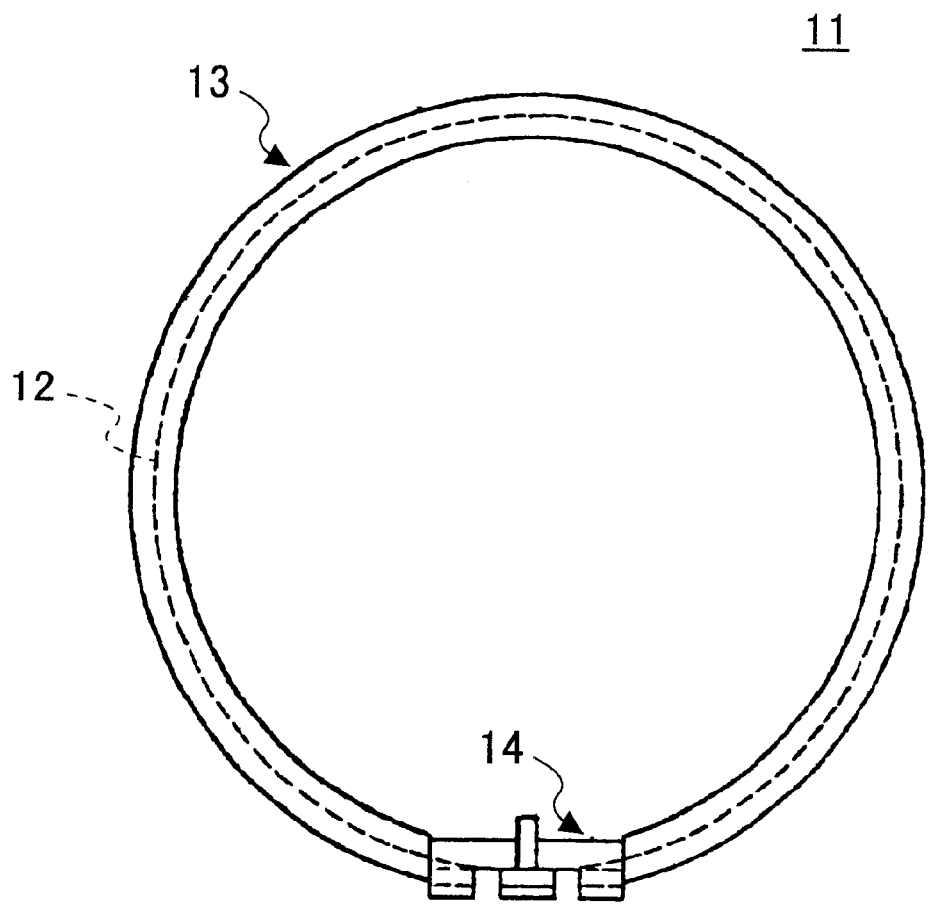
FIG. 2A is a plan view of an optical-fiber winding framework according to an embodiment of the present invention.
Figure 2B:
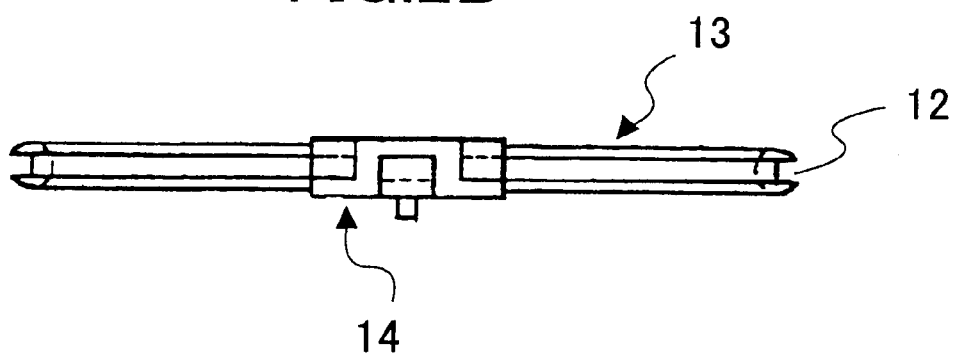
FIG. 2B is a front view of the optical-fiber winding framework shown in FIG. 2A.
Figure 2C:
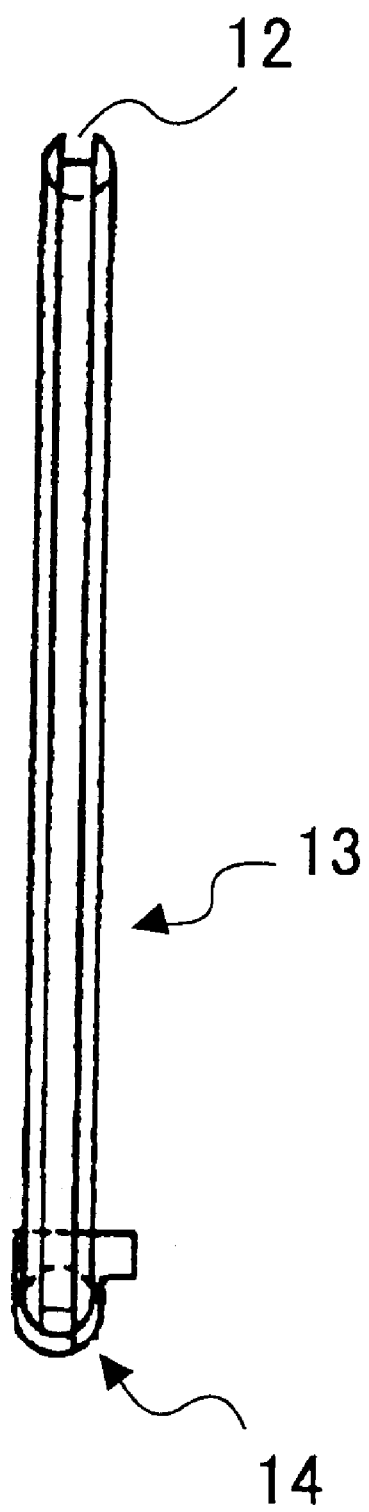
FIG. 2C is a side view of the optical-fiber winding framework shown in FIG. 2A.

FIG. 2A is a plan view of an optical-fiber winding framework 11. FIG. 2B is a front view of the optical-fiber winding framework 11. FIG. 2C is a side view of the optical-fiber winding framework 11. The optical-fiber winding framework 11 is in the form of a continuous unitary ring as a whole, and comprises an optical-fiber winding frame portion 13, and a base portion 14. The optical-fiber winding frame portion 13 has an optical-fiber containing groove 12 opening outwardly along a periphery of the optical-fiber winding frame portion 13. The base portion 14 is a turning axle, and has a linear form in an axial direction thereof as seen in the plan view of FIG. 2A and the front view of FIG. 2B, and has a circular section as seen in the side view of FIG. 2C.

The optical-fiber winding frame portion 13 has a circular cross section as seen in the plan view of FIG. 2A. A circle defined by a bottom surface of the optical-fiber containing groove 12 has a radius of 30 mm or larger. The radius of 30 mm is a currently nominal minimum allowable curvature radius for an optical fiber. Accordingly, the above-mentioned circle has a diameter of 60 mm or larger.

Figure 3A:
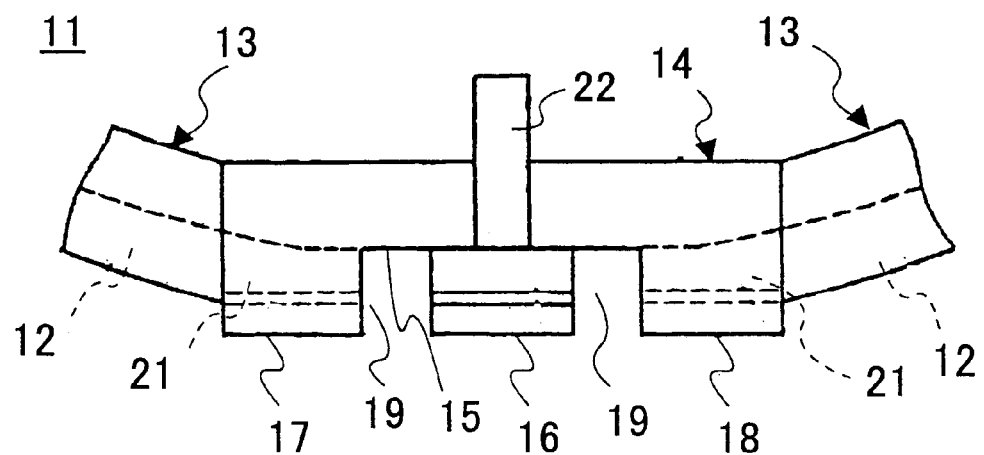
FIG. 3A is a plan view of a base portion shown in FIG. 2A.
Figure 3B:
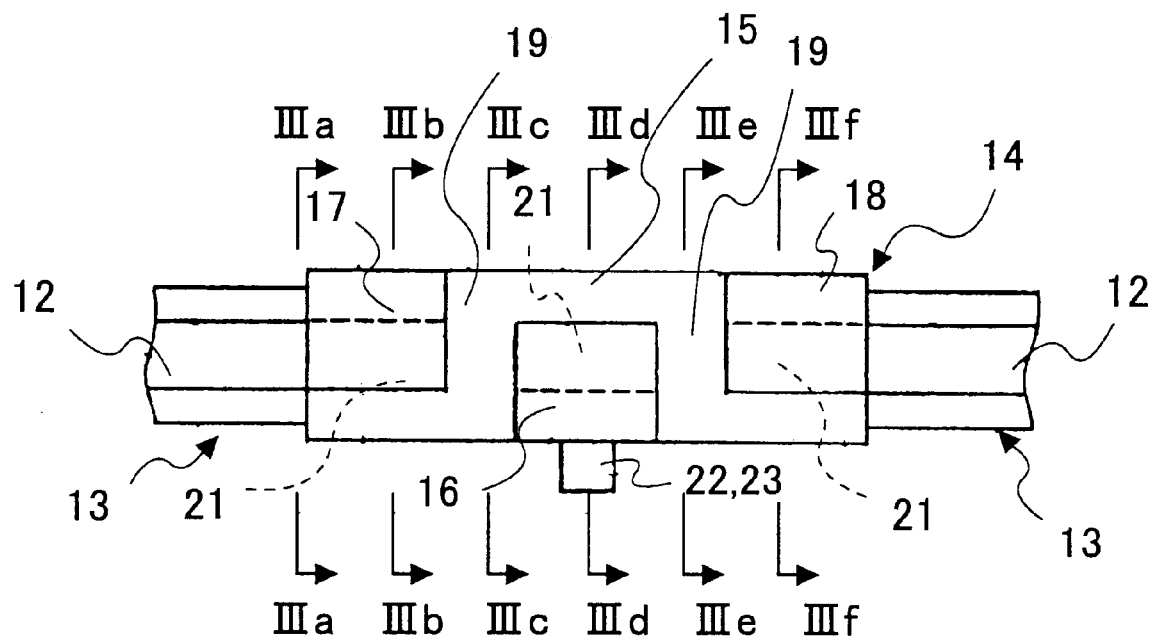
FIG. 3B is a front view of the base portion shown in FIG. 2B.
Figure 3C:
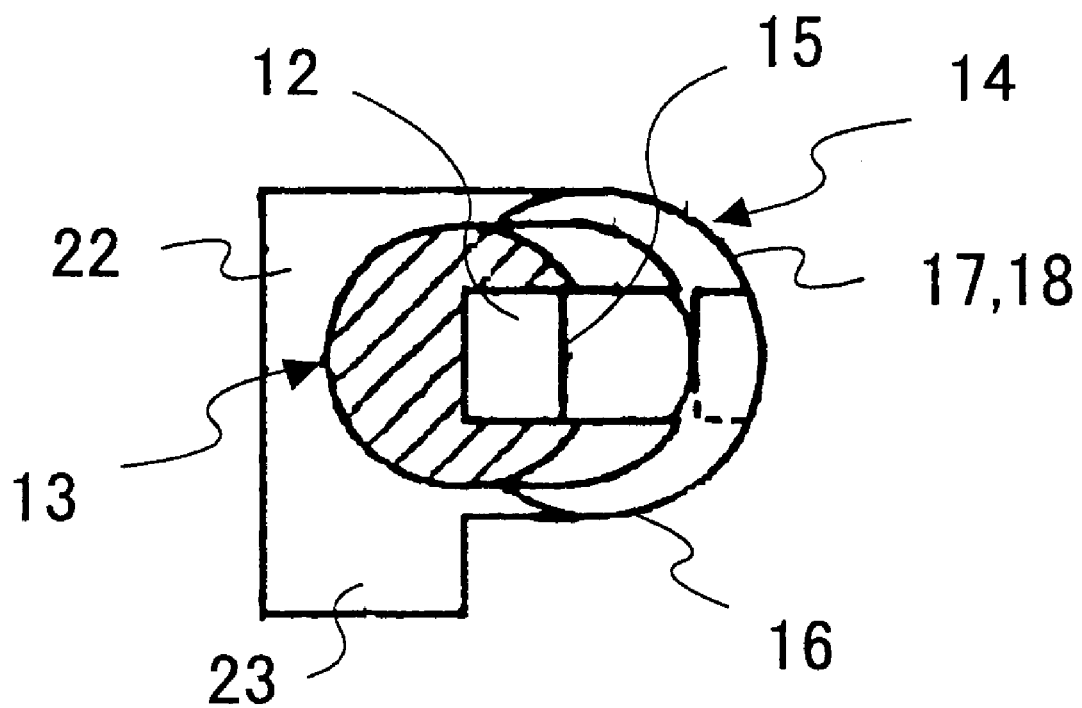
FIG. 3C is a reverse side view of the base portion shown in FIG. 2C.

FIG. 2B and magnified views of FIG. 3A, FIG. 3B and FIG. 3C illustratively show the base portion 14 continuous at both ends to the optical-fiber containing groove 12. FIG. 3A is a plan view corresponding to FIG. 2A. FIG. 3B is a front view corresponding to FIG. 2B. FIG. 3C is a reverse side view corresponding to FIG. 2C.

The base portion 14 has a plane 15 extending in the axial direction at a position corresponding to the center of the circular section, as seen in the side view of FIG. 3C. This plane 15 is continuous with the bottom surface of the optical-fiber containing groove 12. The base portion 14 has a circular axial part through a central portion 16, and left and right end portions 17 and 18, the circular axial part being sectioned by first openings 19 reaching the plane 15, as shown in FIG. 3A and FIG. 3C. The first openings 19 are formed in parallel at boundaries between the central portion 16 and the end portions 17 and 18.

Second openings 21 are formed in the central portion 16 and the end portions 17 and 18 in parallel with the plane 15. The second opening 21 formed in the central portion 16 opens upwardly in the front view of FIG. 3B. The second openings 21 formed in the end portions 17 and 18 open downwardly in the front view of FIG. 3B.

The second openings 21 formed in the central portion 16 and the end portions 17 and 18 have a width equal to an opening width of the optical-fiber containing groove 12.

A positioning projection 22 is so formed in a radial direction of the base portion 14 on an outer surface of a central part of the base portion 14 as to project toward the center of the optical-fiber winding framework 11 opposite the second opening 21. The positioning projection 22 comprises a hooked portion 23 formed downwardly beyond a diameter of the circular section of the base portion 14 as shown in the side view of FIG. 3C.

Here, a description will be given, with reference to FIG. 4A to FIG. 4F, of the portions shown in FIG. 3B. FIG. 4A to FIG. 4F are sectional views taken along lines IIIa—IIIa to IIIf—IIIf in FIG. 3B.

Figure 4A:
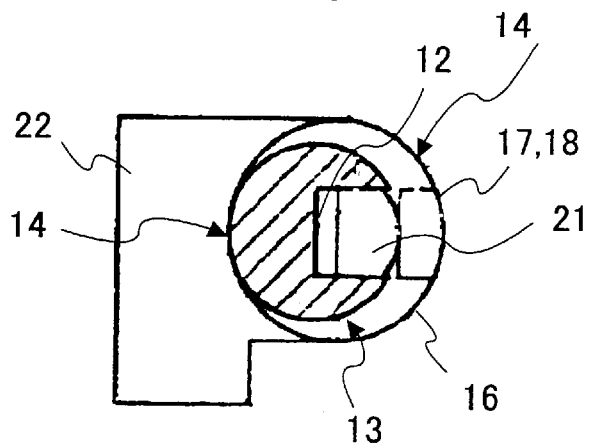
FIG. 4A to FIG. 4F are sectional views taken along lines shown in FIG. 3B.

FIG. 4A shows a section at a part of the optical-fiber winding frame portion 13 adjacent to a boundary with an end surface of the base portion 14. As shown in FIG. 4A, the diameter of the circular section of the base portion 14 is larger than a diameter of a circular section of the optical-fiber winding frame portion 13. Also, as described mentioned above, the width of the second openings 21 formed in the central portion 16 and the end portions 17 and 18 equals the opening width of the optical-fiber containing groove 12.

Figure 4B:
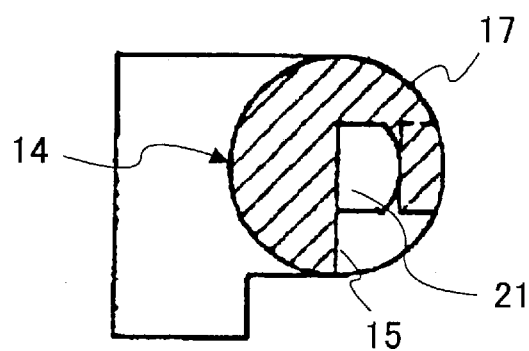

FIG. 4B shows a section at a part of the left end portion 17 shown in FIG. 3B. FIG. 4B illustrates the forms of the second opening 21 opening downwardly and the plane 15.

Figure 4C:
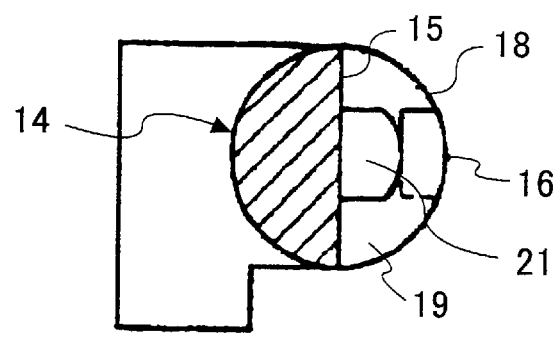

FIG. 4C shows a section at a part of the first opening 19 located at the left side in FIG. 3B. FIG. 4C illustrates a tunnel formed by the plane 15 and the second openings 21 in the central portion 16 and the right end portion 18, which is suitable as a path for containing an optical fiber.

Figure 4D:
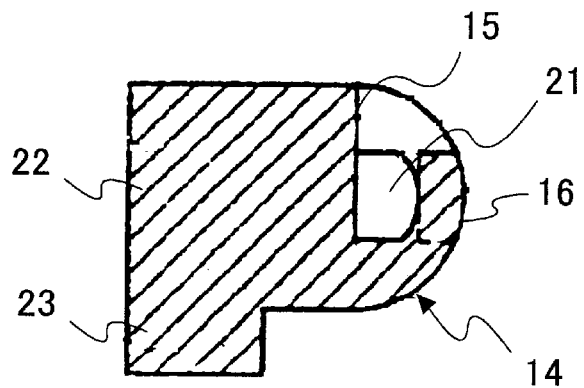

FIG. 4D shows a section at a part of the central portion 16 including the positioning projection 22. As shown in FIG. 4D, the position of the plane 15 coincides with the center of the circular section of the base portion 14. The positioning projection 22 has a height equal to the diameter of the circular section of the base portion 14, and the hooked portion 23 projects downwardly from the base portion 14.

Figure 4E:
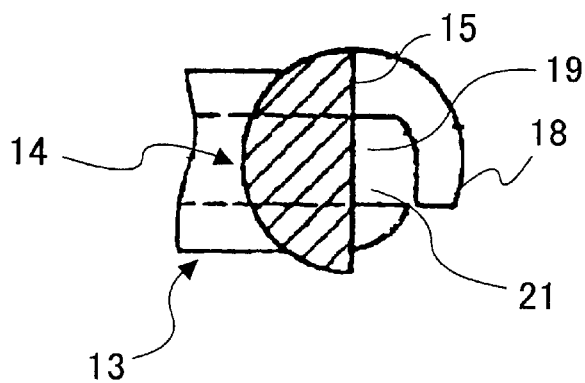

FIG. 4E shows a section at a part of the first opening 19 located at the right side in FIG. 3B. FIG. 4E corresponds to FIG. 4C except for the central portion 16 and the first opening 19 located at the left side.

Figure 4F:
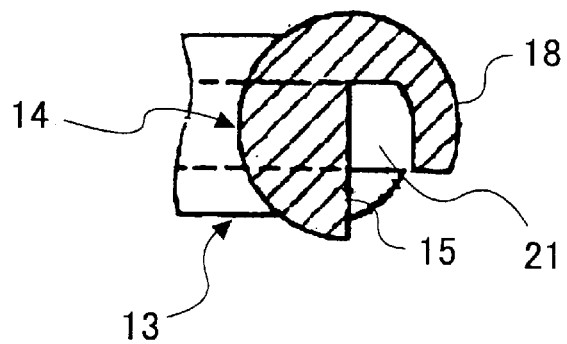

FIG. 4F shows a section at a part of the right end portion 18 shown in FIG. 3B. FIG. 4F illustrates the forms of the second opening 21 opening downwardly and the plane 15, as in FIG. 4B.

As described above, in the base portion 14, the second openings 21 are formed symmetrically in the central portion 16 and the end portions 17 and 18 so as to open upwardly and downwardly. Accordingly, an optical fiber contained in the second openings 21 can move in a longitudinal direction thereof, but cannot protrude or come off from the second openings 21.

As shown in FIG. 4A to FIG. 4F, the base portion 14 includes cuttings due to the first openings 19 and the second openings 21. However, the central portion 16 and the end portions 17 and 18 of the base portion 14 form the circular section that allows the base portion 14 to function as the turning axle.

Besides, the optical-fiber winding framework 11 is unitarily formed of synthetic resin molding having a proper surface smoothness and a proper mechanical strength.

Figure 5A:
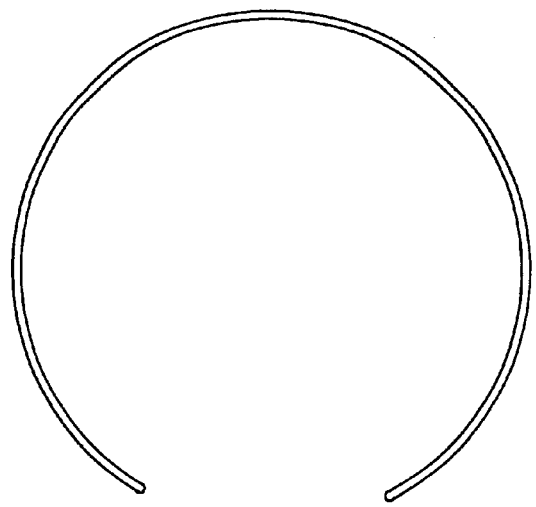
FIG. 5A is a plan view of a cover according to the present embodiment.
Figure 5B:
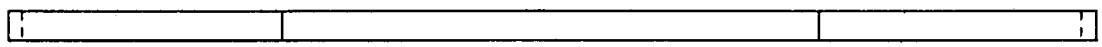
FIG. 5B is a front view of the cover shown in FIG. 5A.

FIG. 5A is a plan view of a cover 24. FIG. 5B is a front view of the cover 24. This cover 24 has a form of a ring having an opening, as shown in the plan view of FIG. 5A. The cover 24 has an inner diameter that allows the cover 24 to be inserted into the optical-fiber containing groove 12 of the optical-fiber winding framework 11 so as to cover the optical-fiber containing groove 12. Accordingly, the cover 24 has a height equal to or slightly smaller than the width of the optical-fiber containing groove 12. The cover 24 is also formed of an elastic synthetic resin material.

Next, a description will be given, with reference to a plan view of FIG. 6, of winding and containing the optical fiber 5 in the optical-fiber winding framework 11. The optical fiber 5 is inserted through the first openings 19 and the second openings 21 of the base portion 14 of the optical-fiber winding framework 11. A predetermined length of the optical fiber 5 is wound and contained in the optical-fiber containing groove 12 of the optical-fiber winding frame portion 13. Both ends of the optical fiber 5 are extended toward left and right from the left and right end portions 17 and 18 of the base portion 14.

Figure 6:
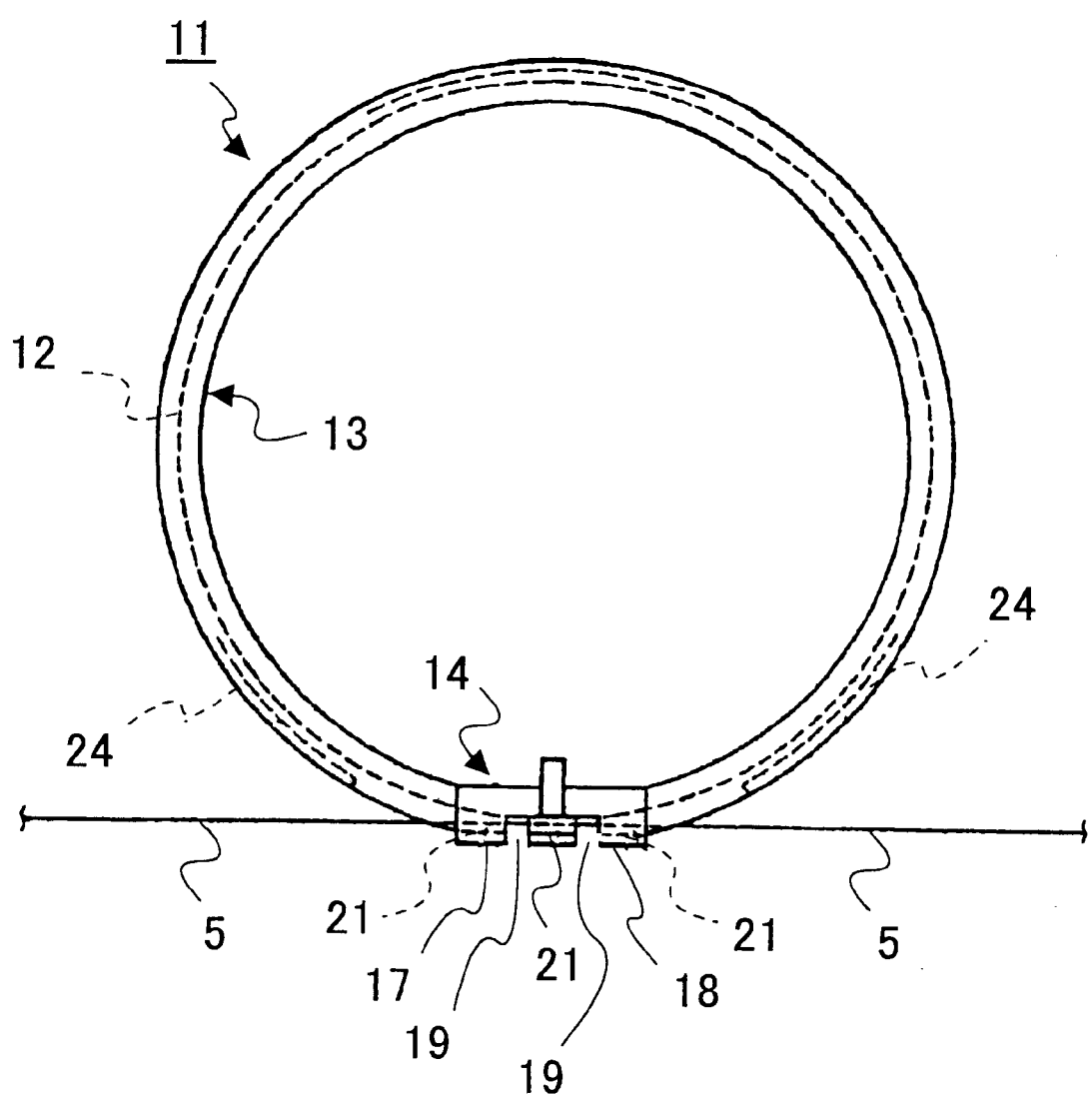
FIG. 6 is a plan view of an optical fiber wound and held in the optical-fiber winding framework.

Subsequently, the cover 24 is inserted into the optical-fiber containing groove 12, as shown in FIG. 6. Since the cover 24 has a proper elasticity, the cover 24 can be easily inserted into the optical-fiber containing groove 12 by spreading the opening of the cover 24. The cover 24 inserted in the optical-fiber containing groove 12 undergoes an elastic restoration so as to constantly press a periphery of the optical fiber 5 wound and contained therein to prevent the optical fiber 5 from coming off from the optical-fiber containing groove 12.

Figure 7A:
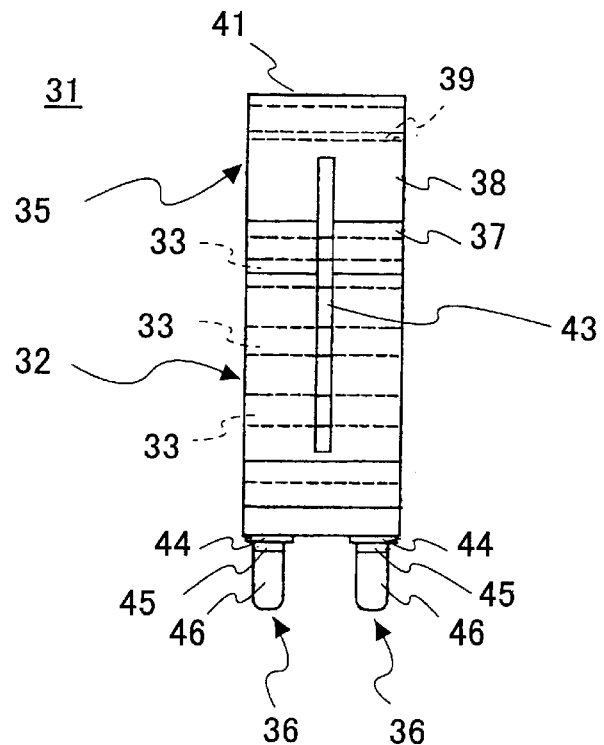
FIG. 7A is a rear view of a support according to the present embodiment.
Figure 7B:
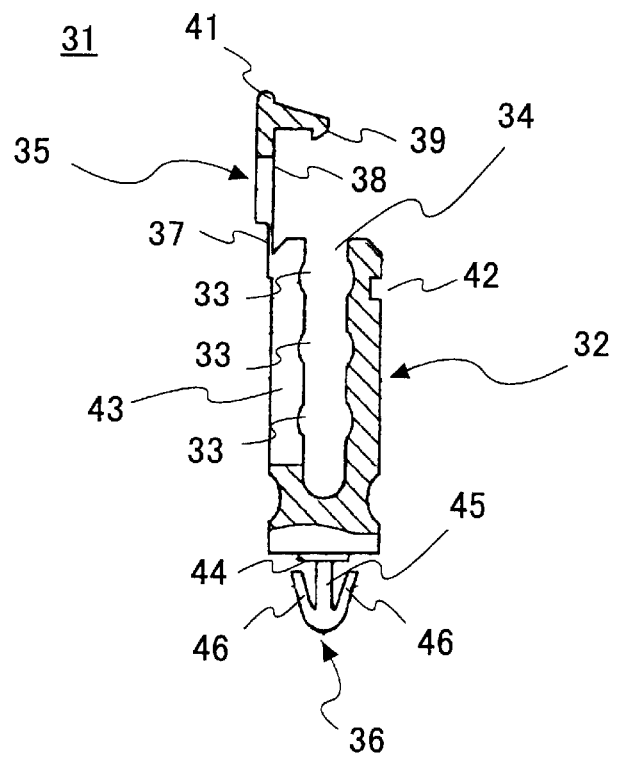
FIG. 7B is a side view of a partial section of the support shown in FIG. 7A.

FIG. 7A is a rear view of a support 31. FIG. 7B is a side view of a partial section of the support 31. As shown in FIG. 7B, the support 31 comprises three circular support portions 33 arranged at an equal interval in a vertical direction of a body unit 32, an opening 34 dividing the support portions 33 in the vertical direction, a lid unit 35 provided at a top end, and locking units 36 provided at a bottom end.

More specifically, the support portions 33 of the body unit 32 are formed in parallel at an equal interval in the vertical direction. The opening 34 formed by parallel planes provides each of the support portions 33 with circular-arc surfaces opposing at both sides. The opening 34 extends further below the lowermost support portion 33.

The lid unit 35 comprises a flexible portion 37 extending upward from the rear side of the body unit 32, a lid portion 38 provided on the flexible portion 37, a hooking portion 39 extending perpendicularly from a top end of the lid portion 38, and a convex portion 41 placed on the top end of the lid portion 38. The hooking portion 39 engages an engage groove 42 formed at the front side of the body unit 32, as described in detail hereinafter.

A groove 43 is formed in the middle of the rear side of the body unit 32, as shown in FIG. 7A. The groove 43 communicates with the opening 34, and extends up to a central part of the lid unit 35.

The two locking units 36 are provided at right and left on a lower end surface of the body unit 32, as shown in FIG. 7A. Each of the locking units 36 comprises a core portion 45 extending downward from the center of a positioning protuberance 44 provided on the lower end surface of the body unit 32, and a V-shaped engaging piece 46 spreading upward obliquely from a lower end of the core portion 45 toward both sides, as shown in FIG. 7B.

The support 31 is unitarily formed of synthetic resin molding having a proper mechanical strength and an excellent springiness.

Figure 8:
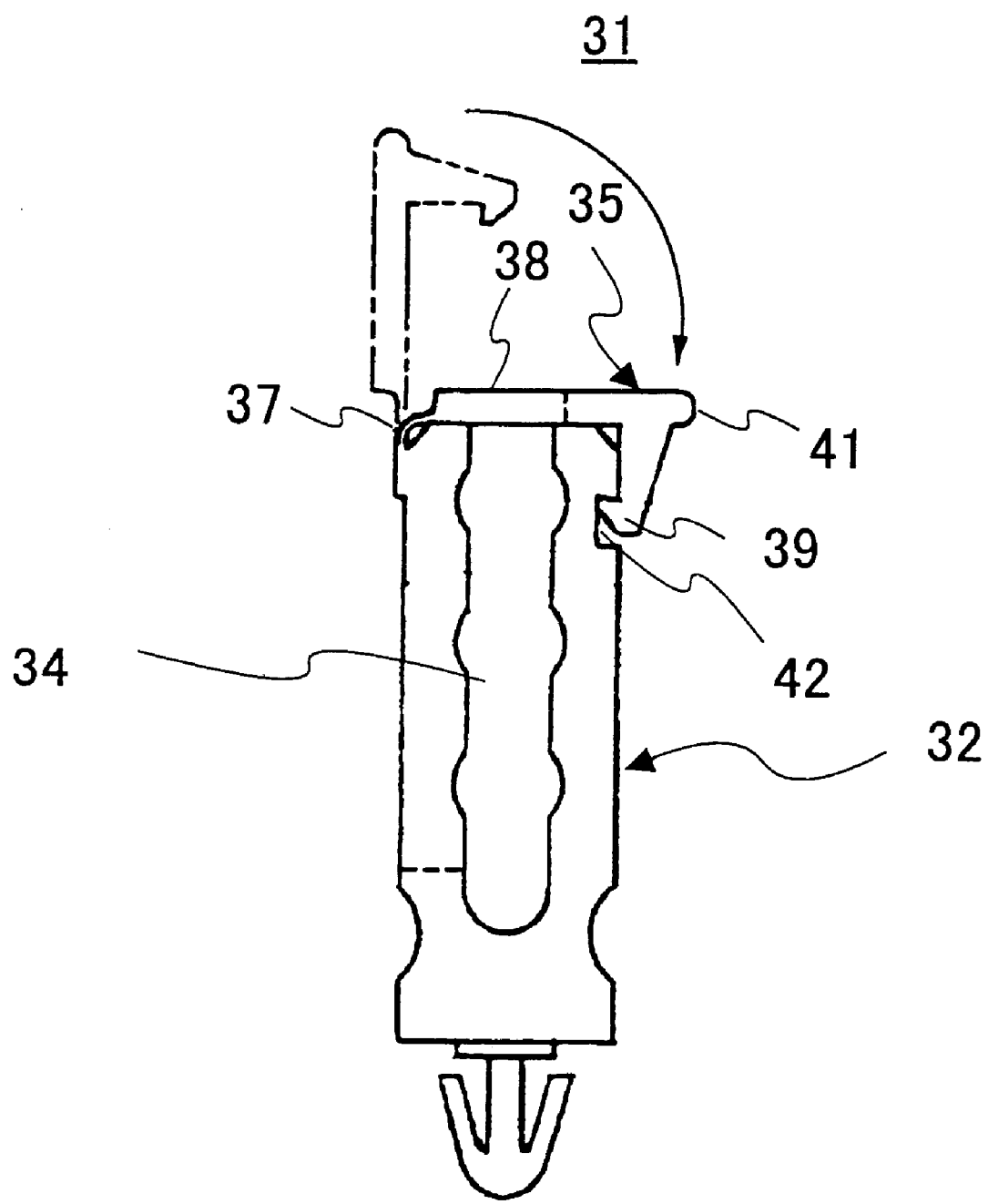
FIG. 8 is an explanatory view of closing a lid unit of the support shown in FIG. 7B.

Next, a description will be given, with reference to FIG. 8, of relationships among the above-mentioned elements of the support 31. As shown in FIG. 8, the lid portion 38 is laid down toward an upper surface of the body unit 32 in a direction indicated by an arrow in FIG. 8 by bending the flexible portion 37 of the lid unit 35. Thereupon, the lid portion 38 covers the opening 34, and the hooking portion 39 engages the engage groove 42 formed at the front side of the body unit 32, as shown in FIG. 8. The hooking portion 39 is locked so that the lid unit 35 is not released naturally. The hooking portion 39 can be unlocked by pushing up the convex portion 41, so that the lid unit 35 is released.

Figure 9A:
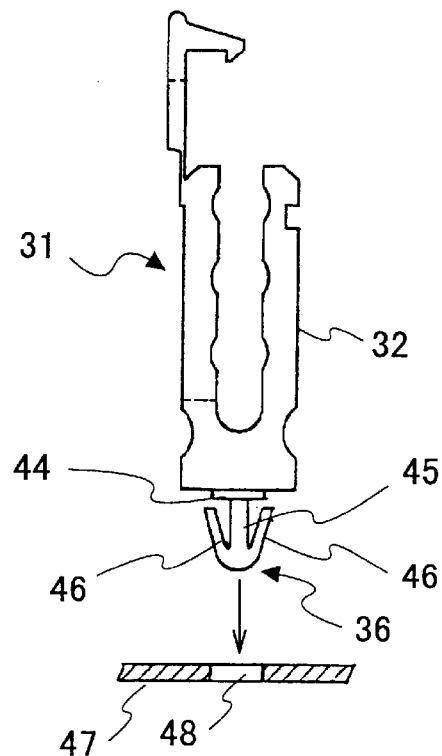
FIG. 9A and FIG. 9B are explanatory views of mounting the support shown in FIG. 7B.
Figure 9B:
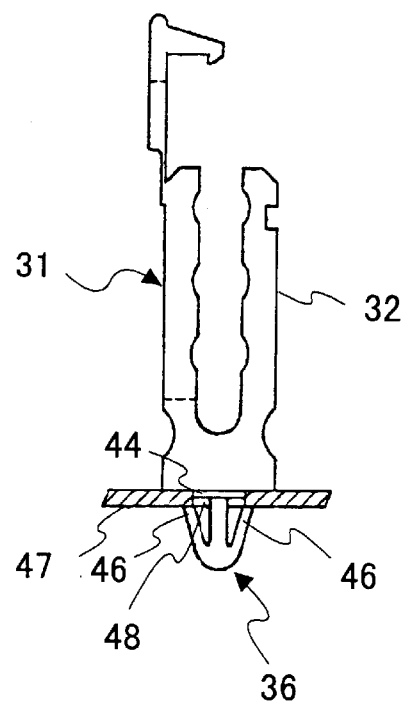

Next, a description will be given, with reference to FIG. 9A and FIG. 9B, of mounting upright the support 31. As shown in FIG. 9A, mounting holes 48 are formed in a substrate 47, although only one of the mounting holes 48 can be seen in FIG. 9A. Each of the locking units 36 provided at the bottom end of the support 31 is inserted into one of the mounting holes 48 as indicated by an arrow in FIG. 9A.

Each of the mounting holes 48 has a size that exactly fits the positioning protuberance 44, and the size is smaller than a width of the V-shaped engaging piece 46. Accordingly, each of the locking units 36 is inserted into the mounting hole 48 by pushing in the V-shaped engaging piece 46. In the course of pushing in the V-shaped engaging piece 46, the V-shaped engaging piece 46 undergoes an elastic deformation so that arms of the V-shaped engaging piece 46 come closer to each other. Once the V-shaped engaging piece 46 passes the mounting hole 48, the V-shaped engaging piece 46 spreads back by undergoing an elastic restoration. Thereupon, the V-shaped engaging piece 46 contacts the undersurface of the substrate 47, as shown in FIG. 9B, so that the locking unit 36 does not come off naturally.

The lower end surface of the body unit 32 contacts the upper surface of the substrate 47, and the positioning protuberances 44 engage the mounting holes 48 so as to position the support 31, prohibiting an in-plane movement thereof. Since the two locking units 36 of the support 31 engage the two mounting holes 48, a mounting position of the support 31 is determined so that the support 31 does not rotate on the substrate 47.

Figure 10:
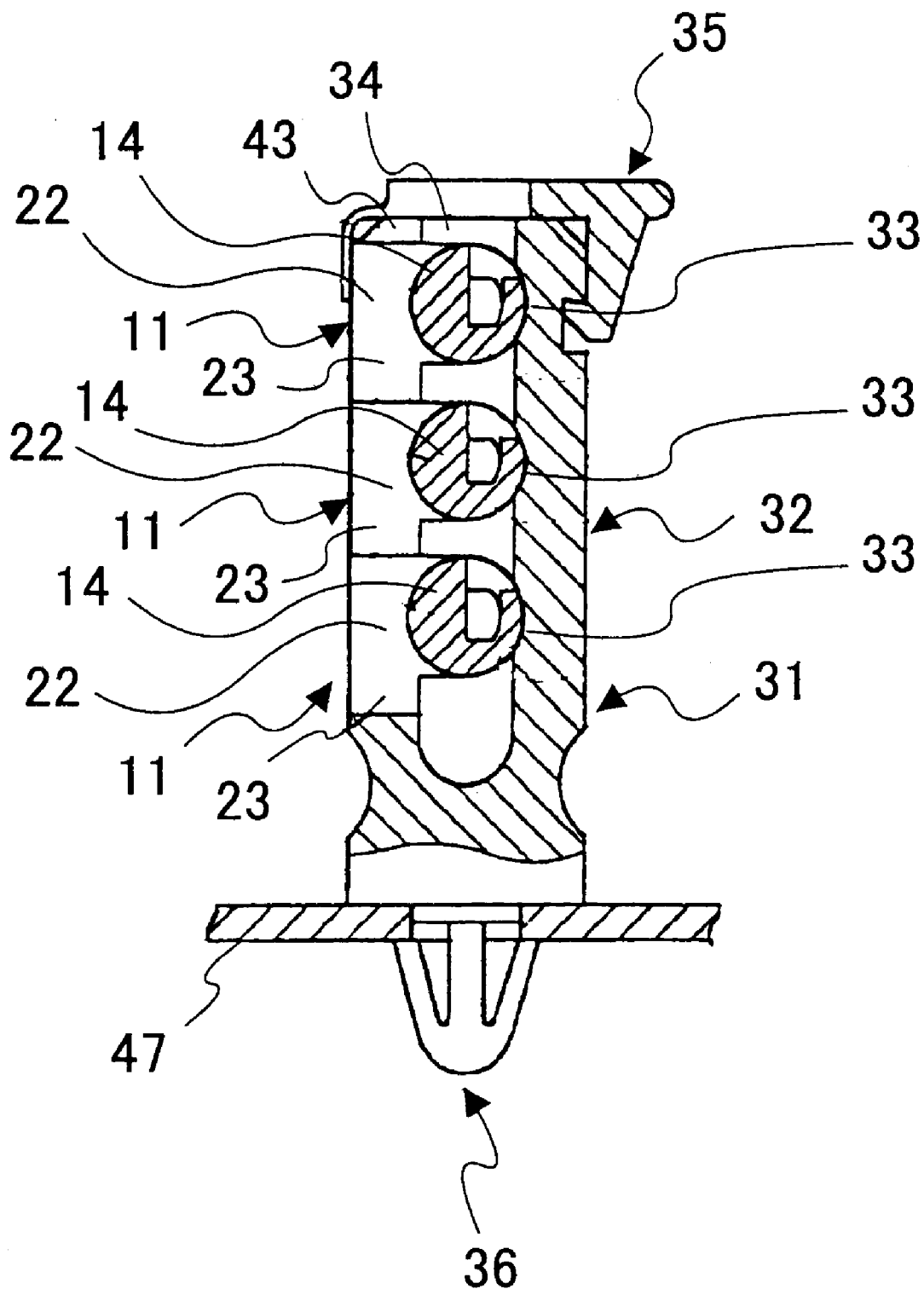
FIG. 10 is a side view of a partial section of the optical-fiber winding framework mounted on the support.

Next, a description will be given, with reference to FIG. 10, of mounting the optical-fiber winding framework 11 on the support 31 mounted upright on the substrate 47. FIG. 10 is a side view of a partial section of the optical-fiber winding framework 11 and the support 31. In a state where the lid unit 35 of the support 31 is released, the base portion 14 of the optical-fiber winding framework 11 is inserted into the opening 34 of the support 31. In this course, the positioning projection 22 is fitted into the groove 43 with the hooked portion 23 facing downward.

The opening 34 has a width smaller than the diameter of the circular section of the base portion 14. Accordingly, pushing the base portion 14 into the opening 34 causes the body unit 32 of the support 31 to undergo an elastic deformation so as to enlarge the width of the opening 34. This enlargement allows the base portion 14 to be pushed to the support portion 33. Thereupon, the body unit 32 undergoes an elastic restoration so as to hold the base portion 14 tightly within the support portion 33.

Repeating the above-described pushing course eventually positions the base portion 14 at the lowermost support portion 33 of the support 31. At this point, an end surface of the hooked portion 23 of the positioning projection 22 contacts a bottom end surface of the groove 43 so as to determine a relative position of the optical-fiber winding framework 11 to the support 31.

Figure 11A:
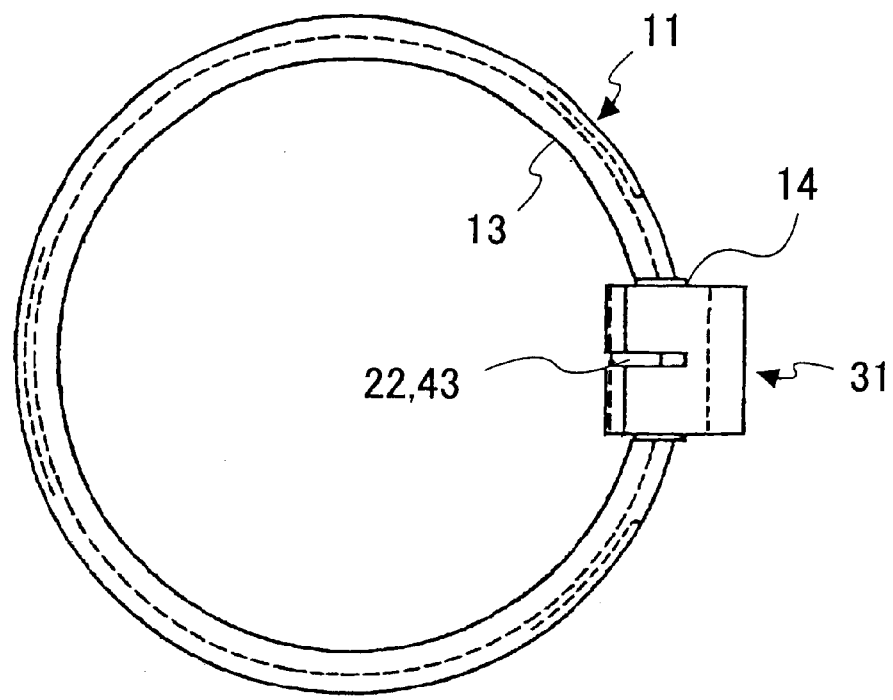
FIG. 11A is a plan view of three optical-fiber winding frameworks mounted on the support.
Figure 11B:
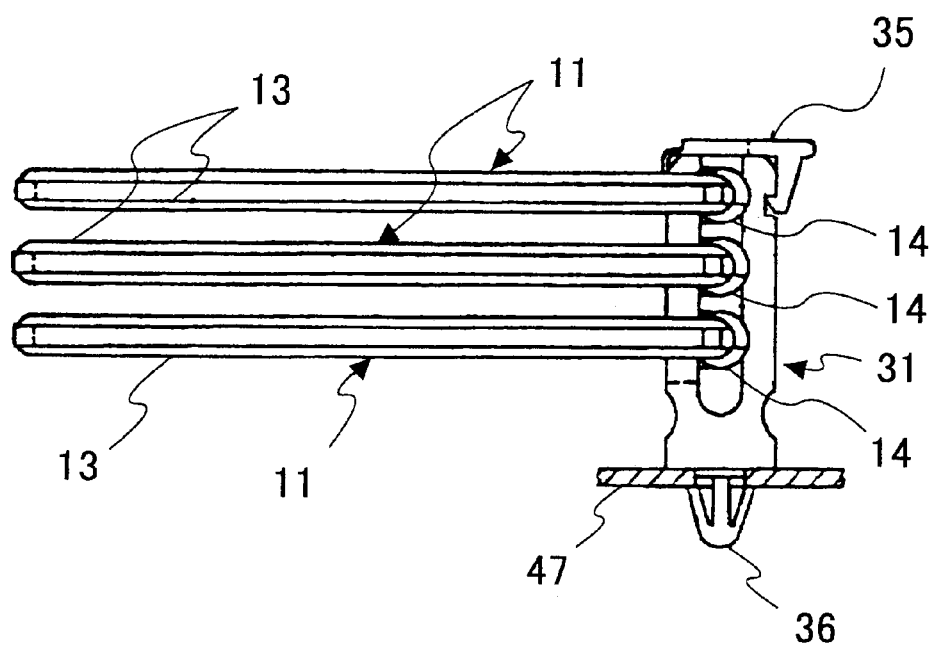
FIG. 11B is a side view of the three optical-fiber winding frameworks mounted on the support.

Preparing another couple of the optical-fiber winding frameworks 11 and inserting the couple to the rest of the support portions 33 results in the three optical-fiber winding frameworks 11 mounted on the support 31, as shown in a plan view of FIG. 11A and a side view of FIG. 11B. In this state, a lower end surface of the hooked portion 23 of the positioning projection 22 contacts an upper end surface of the lower positioning projection 22 so as to determine relative positions of the optical-fiber winding frameworks 11, as shown also in FIG. 10.

In addition, when the lid unit 35 is closed as described with reference to FIG. 8, not only the lid unit 35 covers the opening 34, but also bending the flexible portion 37 causes a part of the body unit 32 near the flexible portion 37 to be drawn so as to narrow the opening width of the opening 34. Thereby, the optical-fiber winding framework 11 supported in the support portion 33 is positioned and held tightly so as not to rotate naturally.

As described above, inserting the positioning projection 22 into the groove 43 of the support 31 determines a relative position of the base portion 14 to the support 31 so as to prohibit a movement in the axial direction of the base portion 14. However, the base portion 14 can turn in a turning direction thereof, as described hereinafter, while the relative positions among the optical-fiber winding frameworks 11 are maintained in parallel, as shown in FIG. 11B.

In a state shown in FIG. 11B, the uppermost optical-fiber winding framework 11 can be turned on the base portion 14 with respect to the support 31 by lifting an end of the optical-fiber winding frame portion 13 of the optical-fiber winding framework 11. This is possible because the positioning projection 22 can move in the groove 43 of the support 31 in the turning direction of the base portion 14.

Subsequently, the middle and lowermost optical-fiber winding frameworks 11 can be successively turned in a direction indicated by an arrow shown in a side view of FIG. 12. Accordingly, all of the optical-fiber winding frameworks 11 can take inclined postures at upward withdrawal positions above the upper surface of the substrate 47.

Figure 13:
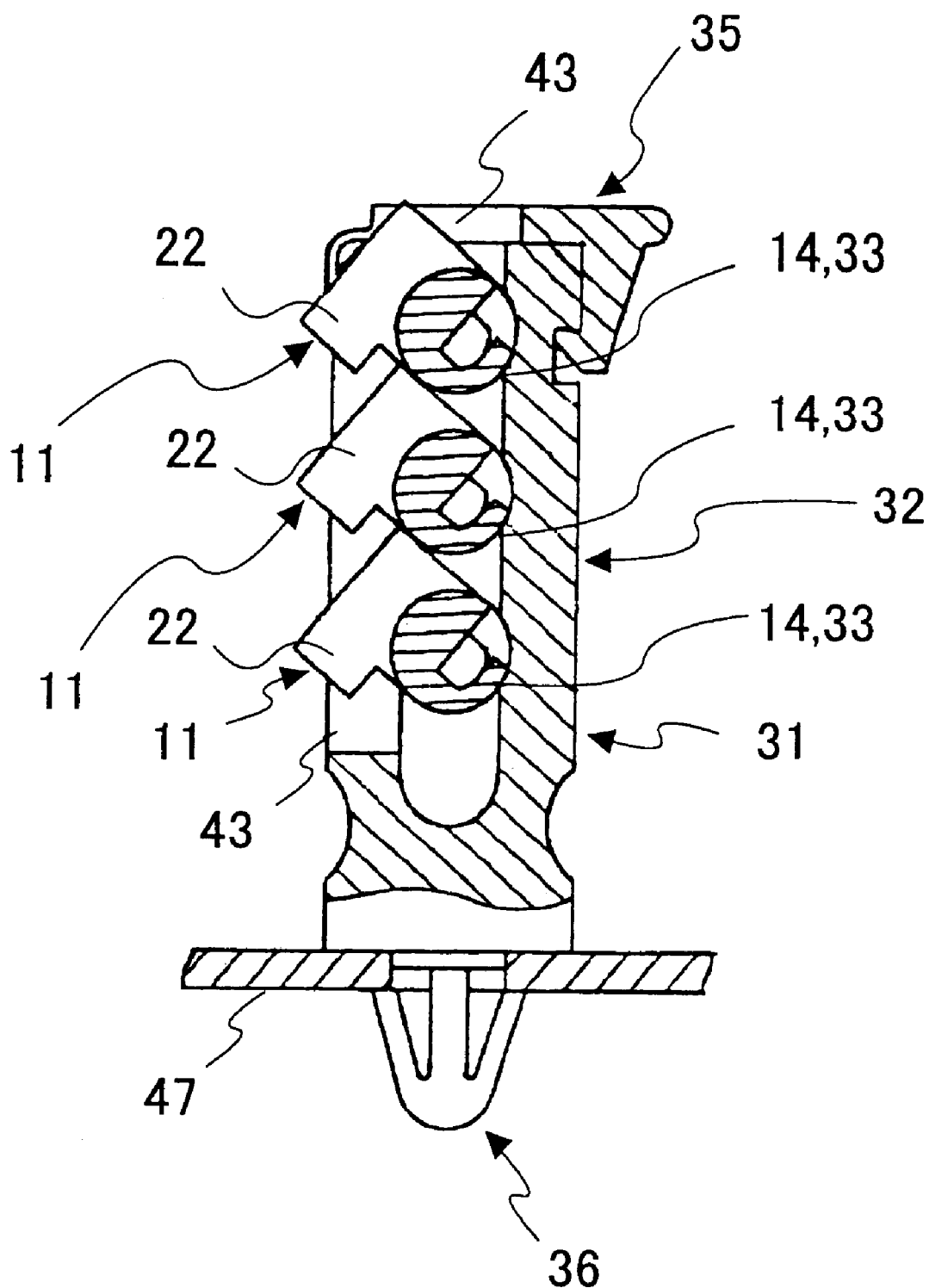
FIG. 13 is a side view of a partial section of the base portions and the support in the inclined positions shown in FIG. 12.

FIG. 13 is a side view of a partial section of the optical-fiber winding framework 11 and the support 31, illustrating relationships between the support 31 and the base portions 14 in the above-mentioned inclined postures. As shown in FIG. 13, the middle and lowermost positioning projections 22 contact the undersurface of the respective upper base portions 14 so as not to turn further beyond.

Figure 12:
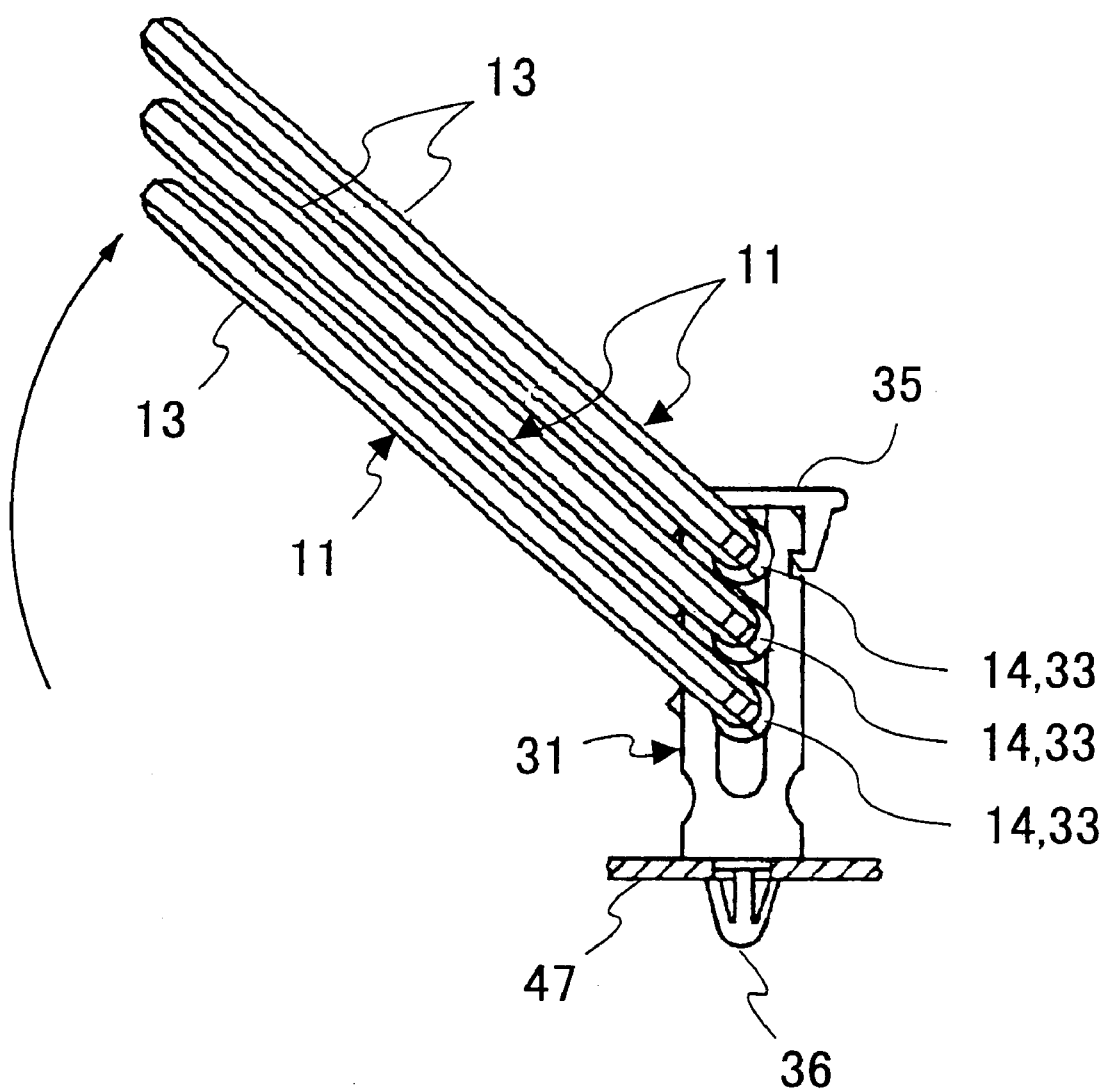
FIG. 12 is an explanatory view of turning the optical-fiber winding frameworks to inclined positions.

Each of the optical-fiber winding frameworks 11 can be turned and inclined to any position between the position shown in FIG. 11 and the position shown in FIG. 12, provided that the upper optical-fiber winding framework 11 restricts the position of the lower optical-fiber winding framework 11.

As described above, the base portion 14 is a turning axle having the circular section as seen in the side views, and the support portion 33 is a circular axle bearing comprising the circular-arc surfaces opposing at both sides, even though the support portions 33 is divided by the opening 34. Accordingly, the base portion 14 and the support portion 33 form a relationship of a turning axle and an axle bearing in which the base portion 14 as the turning axle is inserted into and supported rotatably on the support portion 33 as the axle bearing. Thereby, the optical-fiber winding framework 11 is rotatably supported on the support 31.

Figure 14:
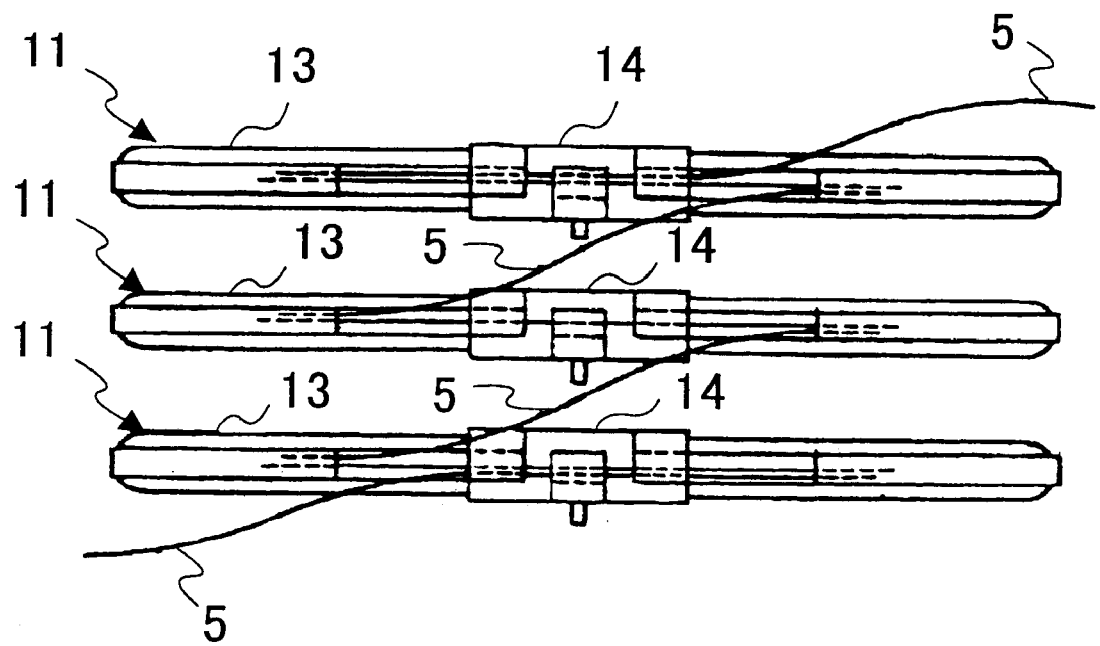
FIG. 14 is an explanatory view of winding and holding one optical fiber in the three optical-fiber winding frameworks.

When a plurality of the optical-fiber winding frameworks 11 are mounted and supported on the support 31 as described above, the optical fibers 5 are wound and held in the respective optical-fiber winding frameworks 11, as described with respect to FIG. 6. Further, as shown in a plan view of FIG. 14 illustrating the optical-fiber winding frameworks 11, one optical fiber 5 can be wound and held across the three optical-fiber winding frameworks 11 successively. Accordingly, even when the optical fiber 5 has a larger length, the optical fiber 5 can be held in the optical-fiber winding frameworks 11.

Thus, any combination of numbers of the optical-fiber winding frameworks 11 and the optical fibers 5 is adaptable.

Figure 1B:
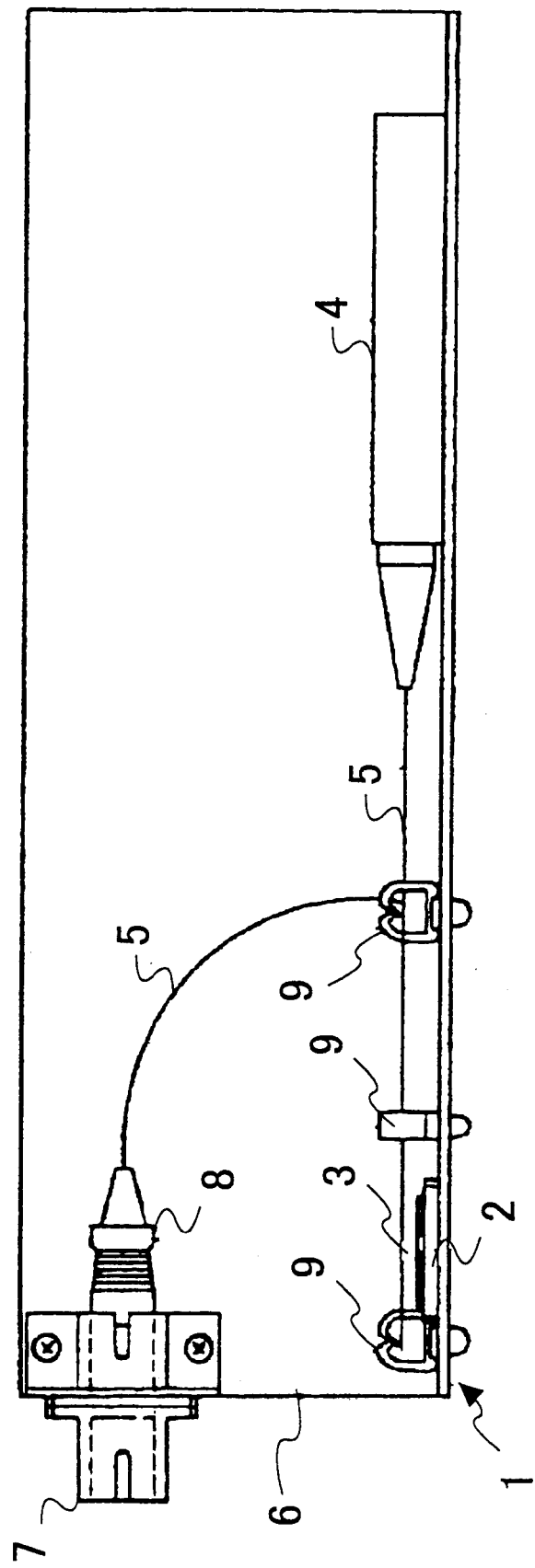
FIG. 1B is a side view of the printed board unit shown in FIG. 1A.
Figure 15A:
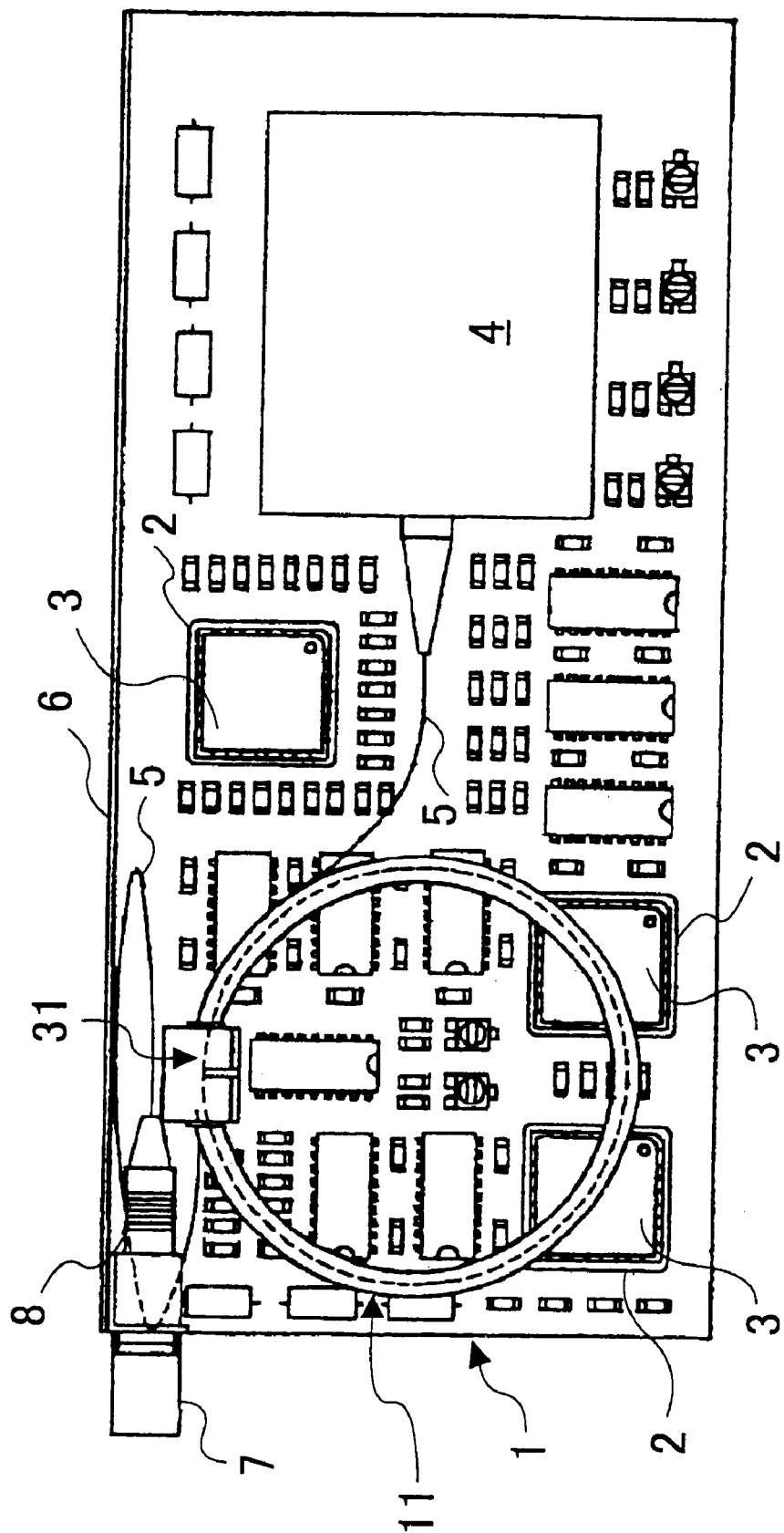
FIG. 15A is an explanatory plan view of mounting an optical-fiber holder according to the present embodiment on a printed board unit.
Figure 15B:
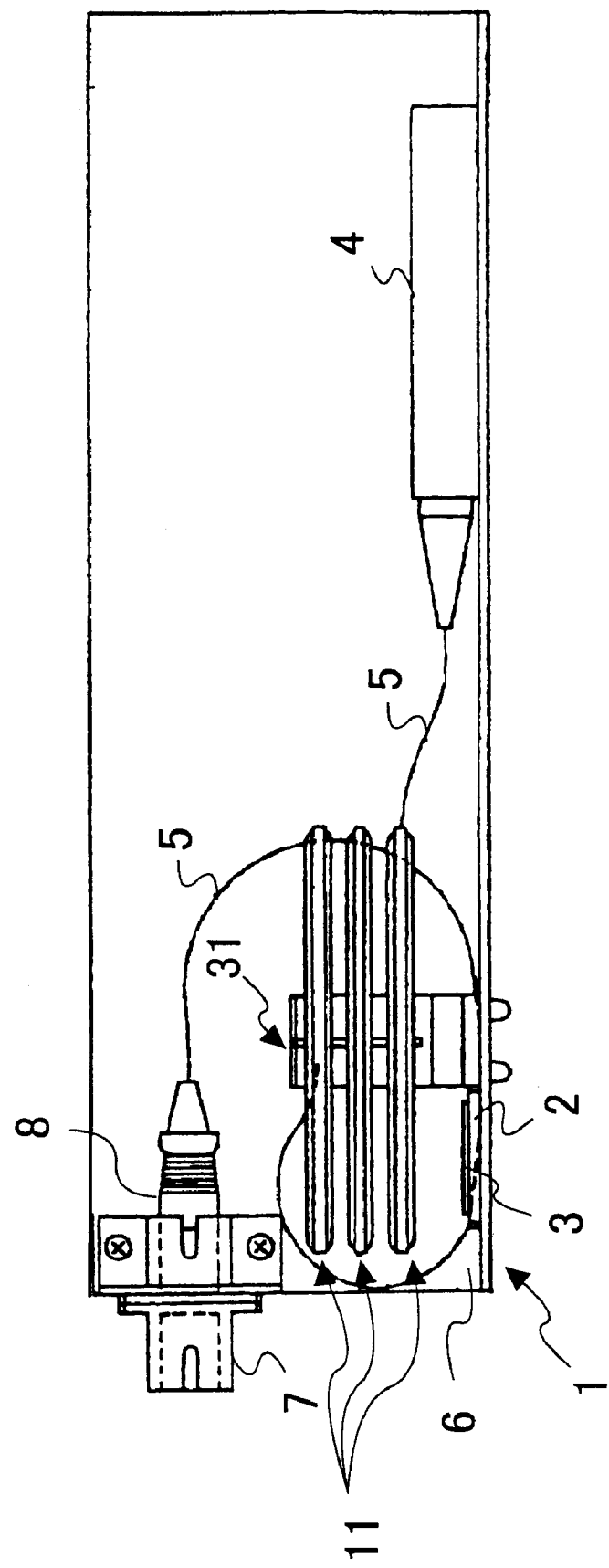
FIG. 15B is an explanatory side view of mounting the optical-fiber holder according to the present embodiment on the printed board unit.

FIG. 15A is a plan view of an optical-fiber holder according to the present embodiment provided on the printed wiring board 1 of a printed board unit. FIG. 15B is a side view of the optical-fiber holder provided on the printed wiring board 1 of the printed board unit shown in FIG. 15A. The optical-fiber holder according to the present embodiment comprises the optical-fiber winding framework 11, the cover 24, and the support 31. The printed board unit shown in FIG. 15A and FIG. 15B has basically the same structure as the printed board unit shown in FIG. 1A and FIG. 1B, except for the optical-fiber holder according to the present embodiment provided instead of the holders 9. In FIG. 15A and FIG. 15B, the support 31 is mounted upright on the printed wiring board 1, as described with reference to FIG. 9A and FIG. 9B, and the one optical fiber 5 is wound and held in the three optical-fiber winding frameworks 11, as described with reference to FIG. 14. This optical fiber 5 is connected with the optical module 4 at one end, and is connected with the optical connector 8 at the other end.

Figure 16:
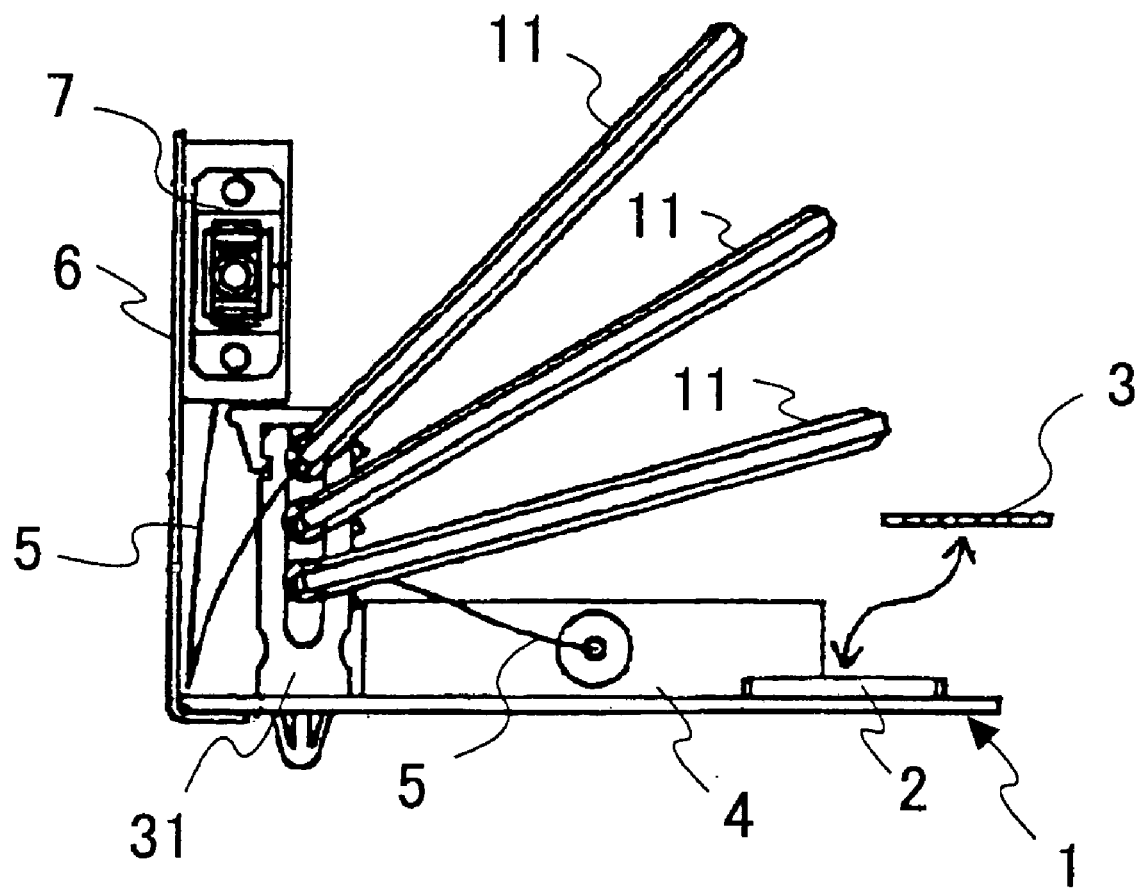
FIG. 16 is an explanatory side view of a function of the optical-fiber holder shown in FIG. 15.

The IC device 3 inserted into the square socket 2 is mounted on the printed wiring board 1. The optical fiber 5 is wound and held across the IC device 3 in the proximity thereof. When the IC device 3 has to be exchanged, the optical-fiber winding frameworks 11 are turned upward to take inclined postures, as shown in a side view of FIG. 16, in the same manner as described with reference to FIG. 12. These inclined postures of the optical-fiber winding frameworks 11 create a space above the IC device 3 so that the IC device 3 can be exchanged, or demounted and remounted, with ease.

The optical-fiber holder according to the present embodiment is not limited to the above-described embodiment, and variations and modifications may be made as long as an optical fiber is wound and held in at least one optical-fiber winding framework 11 shown in FIG. 2. Additionally, the positioning projection 22 secures a positioning of the optical-fiber winding framework 11, although the positioning projection 22 is not requisite. Further, the support 31 may comprise only one support portion 33, not a plurality of the support portions 33 as shown in FIG. 7A and FIG. 7B. That is, the support 31 may comprise at least one support portion 33, and can comprise any number of the support portions 33 if necessary. Furthermore, the support 31 comprising at least one support portion 33 may be unitarily formed on a part of a unit or a module such as the printed board unit so that the optical-fiber winding framework 11 is supported on the unitarily formed support. When the support 31 comprises only one support portion 33, the support 31 does not necessarily comprise the lid unit 35.

In addition, combining the cover 24 shown in FIG. 5A and FIG. 5B with the optical-fiber winding framework 11 prevents the optical fiber 5 wound in the optical-fiber winding framework 11 from coming off therefrom so as to maintain a stable containment of the optical fiber 5. The cover 24 can be replaced with other means.

The present invention is not limited to the specifically disclosed embodiments, and variations and modifications may be made without departing from the scope of the present invention.

The present application is based on Japanese priority application No. 2001-353220 filed on Nov. 19, 2001, the entire contents of which are hereby incorporated by reference.

What is claimed is:

1. An optical-fiber holder comprising:

an annular optical-fiber winding framework including an optical-fiber winding frame portion having an optical-fiber containing groove formed along a periphery thereof, and a base portion provided as a turning axle of said optical-fiber winding framework, the base portion having an opening penetrating into an interior of said base portion and communicating with said optical-fiber containing groove at both ends, wherein an optical fiber is wound and held in said interior of said base portion and said optical-fiber containing groove.

2. An optical-fiber holder comprising:

an annular optical-fiber winding framework including an optical-fiber winding frame portion having an optical-fiber containing groove formed along a periphery thereof, and a base portion provided as a turning axle of said optical-fiber winding framework, the base portion having an opening penetrating into an interior of said base portion and communicating with said optical-fiber containing groove at both ends; and a cover inserted in a periphery of said optical-fiber containing groove so as to cover said optical-fiber containing groove.

3. An optical-fiber holder comprising:

an annular optical-fiber winding framework including an optical-fiber winding frame portion having an optical-fiber containing groove formed along a periphery thereof, and a base portion provided as a turning axle of said optical-fiber winding framework, the base portion having an opening penetrating into an interior of said base portion and communicating with said optical-fiber containing groove at both ends; and a support including a support portion holding said base portion, and an opening leading said base portion into said support portion.

4. An optical-fiber holder comprising:

an annular optical-fiber winding framework including an optical-fiber winding frame portion having an optical-fiber containing groove formed along a periphery thereof, and a base portion provided as a turning axle of said optical-fiber winding framework, the base portion having an opening penetrating into an interior of said base portion and communicating with said optical-fiber containing groove at both ends, and having a positioning projection formed in a radial direction of said base portion on an outer surface thereof; and a support including a support portion holding said base portion, an opening leading said base portion into said support portion, and a groove accommodating said positioning projection.

5. An optical-fiber holder comprising:

a plurality of annular optical-fiber winding frameworks each including an optical-fiber winding frame portion having an optical-fiber containing groove formed along a periphery thereof, and a base portion provided as a turning axle of said optical-fiber winding framework, the base portion having an opening penetrating into an interior of said base portion and communicating with said optical-fiber containing groove at both ends, and having a positioning projection formed in a radial direction of said base portion on an outer surface thereof; and a support including a plurality of support portions each holding said base portion, an opening leading said base portion into each of said support portions, and a groove accommodating said positioning projection, wherein said optical-fiber winding frameworks supported on said support are positioned in parallel close to each other by said positioning projection.

6. The optical-fiber holder as claimed in claim 1, wherein said base portion has a circular section and an axial form extending in an axial direction thereof, and includes a plane extending in said axial direction, first openings formed perpendicularly to said plane, a central portion and end portions divided by said first openings, and second openings so formed in said central portion and said end portions as to open in different directions in parallel with said plane.

7. The optical-fiber holder as claimed in claim 3, further comprising a lid unit provided on an end of said opening of said support, the lid unit being capable of opening and closing so as to cover said opening of said support and so as to cause said support portion to hold said base portion tightly by narrowing said opening.

8. The optical-fiber holder as claimed in claim 3, further comprising two locking units provided at an end of said support so as to position said support upright on a mounting substrate by being inserted into mounting holes formed on said mounting substrate.

* * * * *